US012207587B2

(12) United States Patent
Wien et al.

(10) Patent No.: US 12,207,587 B2
(45) Date of Patent: Jan. 28, 2025

(54) MATERIAL INTRODUCTION LOCK FOR A DISTRIBUTION MACHINE, AND DISTRIBUTION MACHINE

(71) Applicant: Amazonen-Werke H. Dreyer SE & Co. KG, Hasbergen (DE)

(72) Inventors: Thomas Wien, Stuhr (DE); Daniel Mertens, Oldenburg (DE); Jan-Eike Luebben, Edewecht (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 705 days.

(21) Appl. No.: 17/425,373

(22) PCT Filed: Jan. 24, 2020

(86) PCT No.: PCT/EP2020/051722
§ 371 (c)(1),
(2) Date: Jul. 23, 2021

(87) PCT Pub. No.: WO2020/156938
PCT Pub. Date: Aug. 6, 2020

(65) Prior Publication Data
US 2022/0095529 A1     Mar. 31, 2022

(30) Foreign Application Priority Data

Jan. 30, 2019   (DE) .................... 10 2019 102 256.8

(51) Int. Cl.
*A01C 7/08*      (2006.01)
*A01C 15/04*     (2006.01)
(52) U.S. Cl.
CPC .............. *A01C 7/082* (2013.01); *A01C 15/04* (2013.01)

(58) Field of Classification Search
CPC ......... A01C 7/082; A01C 15/04; A01C 7/081; A01C 7/08; A01C 7/00; A01C 15/00
See application file for complete search history.

(56) References Cited

U.S. PATENT DOCUMENTS

2015/0166269 A1    6/2015   Roberge et al.

FOREIGN PATENT DOCUMENTS

| DE | 2629278 A1 | 1/1977 |
| JP | 11-168928 A | 6/1999 |

OTHER PUBLICATIONS

International Search Report issued Apr. 17, 2020 in corresponding PCT Application No. PCT/EP2020/051722.

*Primary Examiner* — Christopher J. Novosad
(74) *Attorney, Agent, or Firm* — Mintz Levin Cohn Ferris Glovsky and Popeo, P.C.

(57) ABSTRACT

A material introduction lock for a distribution machine for pneumatically conveying granular material in a conveying line adjoining a material introduction lock includes: an air inlet, a material conveying element, and a material infeed element, where a pneumatic conveying flow is supplied to the material conveying element via the air inlet, and the material infeed element is arranged between the material conveying element and the conveying line so that the granular material in the conveying line supplied via the material infeed element is conveyed in the conveying line by the pneumatic conveying flow supplied by the material conveying element. Further, the material infeed element includes a rinsing nozzle element which is connected to the air inlet and creates a film of air that sheathes the material infeed element from the inside, and the rinsing nozzle element is configured to reduce contact between the granular material and the material infeed element.

13 Claims, 4 Drawing Sheets

MATERIAL INTRODUCTION LOCK FOR A DISTRIBUTION MACHINE, AND DISTRIBUTION MACHINE

Figure 1:
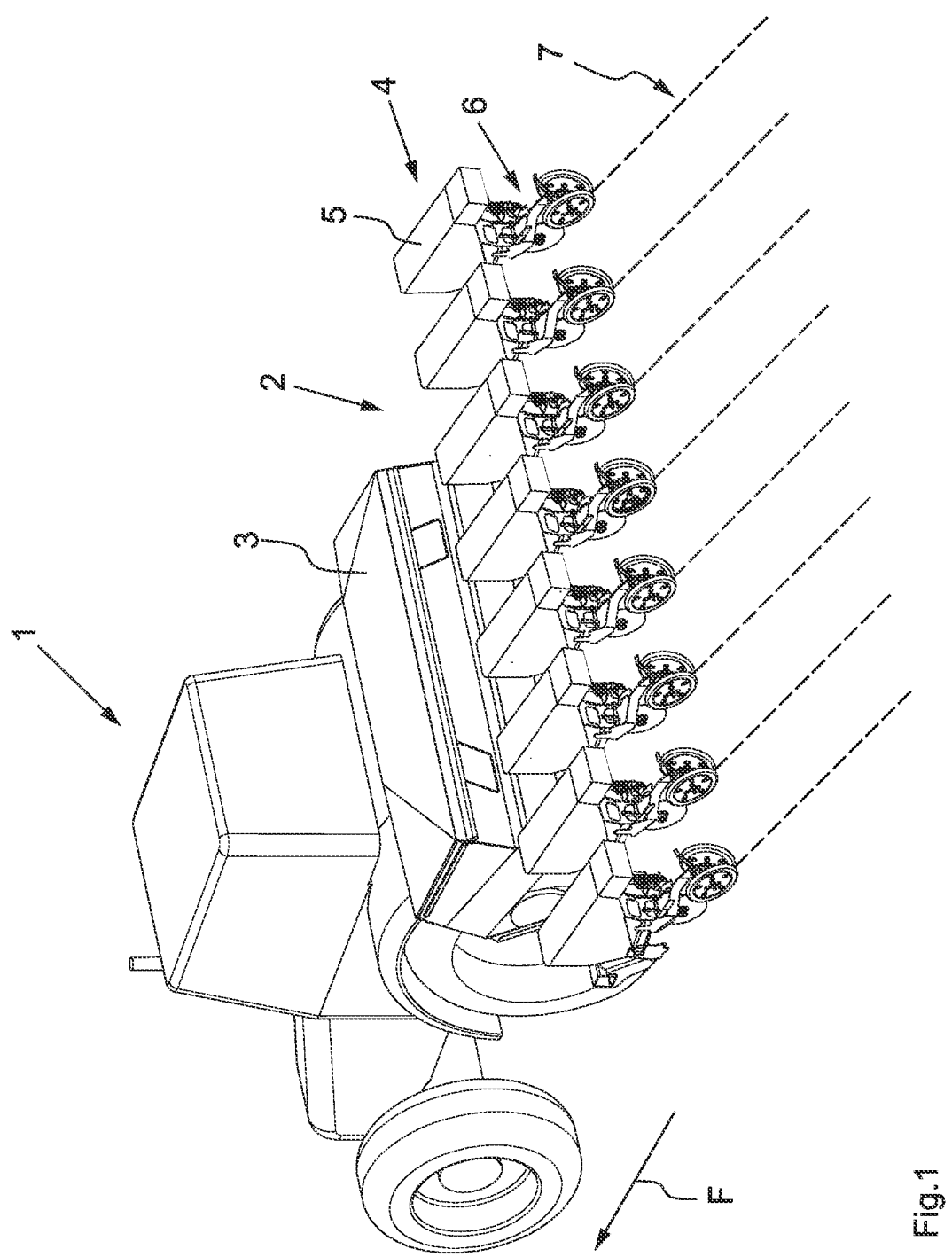

The invention relates to a material introduction lock for a distribution machine, and a distribution machine with a material introduction lock.

Such a material introduction lock is described in U.S. Pat. No. 9,546,051 B2. This material introduction lock is provided for a distribution machine, such as a sower, single grain sower, and/or a fertilizer distribution machine, and is used for pneumatically conveying granular material in at least one conveying line connected to the material introduction lock. The material introduction lock comprises an air inlet which, connected to a blower, serves to provide a pneumatic conveying flow to a material conveying element. Furthermore, the material introduction lock comprises a material infeed element which serves to supply the granular material that is to be conveyed between the material conveying element and the conveying line. The granular material thus supplied to the material introduction lock is conveyed in the adjoining conveying line due to the pneumatic conveying flow introduced by way of the material conveying element.

The granular material to be conveyed is, for example, breakable and/or hygroscopic fertilizers or sometimes dressed seeds. Dust often adheres to such materials as a result of the transport, or the latter can sometimes disintegrate to dust in part due to being loaded.

The disadvantage of this material introduction lock is that the aforementioned dust particles and dirt particles conveyed with the material tend deposit on the walls, in particular in the material infeed element. In the lower part of the material infeed element, the pneumatic conveying flow from the material conveying element mixes with the material supplied so that the dust detaches from the material to a greater extent or the material collides with the walls to a greater extent and is therefore mechanically loaded when it impacts the wall, which stimulates the development of dust. This is particularly disadvantageous because the fouling in the material infeed element is then further increased. The particles of dust and dirt that settle on the walls reduce the achievable throughput of the material introduction lock and can even lead to a complete blockage of the material introduction lock due to so-called caking. In order prevent to avoid such malfunctions, it has hitherto been necessary for the user to regularly dismantle the material introduction lock in order to clean it. Such cleaning measures reduce the achievable area performance of the machine on which the material introduction lock is arranged.

The object of the present invention is therefore to provide a material introduction lock with a material infeed element in which the load due to fouling is reduced.

According to the invention, this object is satisfied in that the material infeed element comprises at least one rinsing nozzle element which is connected to the air inlet and which creates a film of air that sheathes the material infeed element from the inside, that the rinsing nozzle element is configured to reduce the contact between the granular material and the material infeed element due to the film of air.

The invention makes use of the knowledge that both the granular material as well as dust and/or dirt particles are carried by the film of air into the conveying line due to an at least approximately large-area film of air flowing over the inner walls of the material infeed element, i.e. by sheathing the material infeed element from the inside with the film of air by way of the rinsing nozzle element. The grains of the granular material carried along by the pneumatic conveying flow no longer come into contact with the walls of the material infeed element because of the film of air, which forms quasi a protective separating layer, so that the load from fouling is advantageously further reduced. As a result of this measure, not only is the adherence of already existing dust and/or dirt particles effectively reduced, but also the development of further fouling is almost prevented.

Blowing the film of air in via the rinsing nozzle element in the region of the material infeed element raises the local dew point. As a result, fewer water particles are separated from the air in this region. In particular, hygroscopic fertilizers, but also dust and dirt in general, tend to adhere to the walls to a lesser extent and form caking.

In an advantageous further development of the material introduction lock, it is provided that the opening cross section of the at least one rinsing nozzle element through which the flow passes is smaller than the cross section of the material conveying element through which the flow passes, preferably by approximately half. As a result of this measure, it is at least approximately ensured that the amount of air available at the air inlet is appropriately divided between the material conveying element and the rinsing nozzle element. The larger proportion of the amount of air is available to the material conveying element, preferably twice as much as compared to the rinsing nozzle element, for conveying granular material in the conveying line. The remaining amount of air is made available to the rinsing nozzle element whose opening cross section, which is reduced as compared to that of the material conveying element, additionally increases the load-carrying capacity of the film of air. This is caused by the increased flow velocity due to the smaller opening cross section, all other conditions being equal.

In order to obtain the greatest possible development of the film of air, a further advantageous development of the invention provides that the opening cross section of the at least one rinsing nozzle element through which the flow passes has a shape that is elongate transvers to the direction of flow, is in particular almost rectangular, so that the film of air is formed as a flat jet. As a result of this measure, the rinsing nozzle element is configured to form a film of air which is elongate and flat transverse to the direction of flow and therefore nestles particularly well against the walls of the material infeed element.

The material introduction lock is furthermore advantageously further developed in that the material infeed element comprises at least two oppositely disposed approximately upright side walls, that the at least one rinsing nozzle element extends between the at least two side walls and almost adjoins them, so that the film of air nestles against the side walls. This further development is characterized by a particularly large-area formation of the film of air, in particular on the side walls. Such a flow profile has an increased load-carrying capacity of the film of air and protects the walls from fouling in a further improved manner.

In a further advantageous development of the material introduction lock, the at least one rinsing nozzle element is formed by at least two segment nozzles. The segment nozzles are preferably formed to be identical in terms of shape and dimensions. As a result of this measure, the rinsing nozzle element is configured to create a multi-layer film of air, namely one layer for every segment nozzle. A particularly large-area sheathing of the material infeed element is then enabled in a simplified manner.

In a particularly advantageous development of the material introduction lock, the at least two segment nozzles are arranged at least approximately adjacent to one another. As a result of this measure, a particularly large-area development of the film of air is obtained where a particularly homogeneous profile of the composite flow is created. This has the advantage that fewer losses occur and the load-carrying capacity of the film of air is increased.

It is provided in a further advantageous development of the invention that the at least two segment nozzles are arranged at different distances from the material conveying element. The creation of the film of air by way of the rinsing nozzle element formed by the at least two segment nozzles is then less strongly influenced by any flow fluctuations that may occur at the material conveying element. By offsetting the at least two segment nozzles in the direction of flow relative to the material conveying element, the reliable development of a stable film of air is improved.

The material introduction lock is also advantageously further developed in that the material introduction lock is configured as an injector device, where the material conveying element is configured as a drive nozzle which converts the pneumatic conveying flow into a conveying jet that is directed at least approximately into the conveying line and thereby creates a suction effect in the material infeed element. This further development makes use of the Venturi effect which causes a suction effect to arise due to the increased flow velocity and the resulting differential pressure in the direction of flow downstream of the material conveying element configured as a drive nozzle, i.e. in the material infeed element. It is there advantageous that granular material supplied from the material infeed element is sucked into the resulting conveying jet and conveyed in an improved manner in the conveying line. The contact between the material infeed element and the granular material is thereby further reduced, which is beneficial for preventing fouling.

In a further advantageous development of the material introduction lock, the latter comprises a diffuser neck, where the diffuser neck is arranged between the material infeed element and the conveying line, so that the granular material is additionally accelerated in the conveying line. The diffuser neck can be configured as a cross-sectional taper in the direction of flow upstream of the conveying line and thereby creates a pressure increase that enhances the pumping effect in the material infeed element. It is there advantageous that the granular material is sucked into the pneumatic conveying flow to an increased extent in this manner and accelerated in the conveying line.

The object underlying the invention is also satisfied by a distribution machine which comprises a preferably elongate storage container for granular material and tillage tools arranged side by side transverse to the direction of travel for depositing granular material in several rows, where the storage container is associated with at least one metering device for each row for dispensing granular material in controlled quantities into a conveying line that connects the at least one metering device for delivering bulk material to the tillage tools, and a material introduction lock for pneumatically conveying the granular material in the conveying line is arranged between the metering device and the conveying line of each row, where a pneumatic conveying flow created by a blower can at least in part be directed to the material introduction lock of each row, where the material introduction lock is formed according to at least one of the embodiments described above. With regard to the advantages and modifications of the distribution machine according to the invention, the advantages and modifications of the material introduction lock according to the invention are made reference to.

If the distribution machine is configured as a single grain sower with several sowing assemblies arranged side by side transverse to the direction of travel, where each sowing assembly comprises a separate storage container for micro granulate with an associated metering device, the material introduction lock according to at least one of the embodiments described above can be arranged between the metering device of each sowing assembly and the adjoining conveying line.

Figure 3:
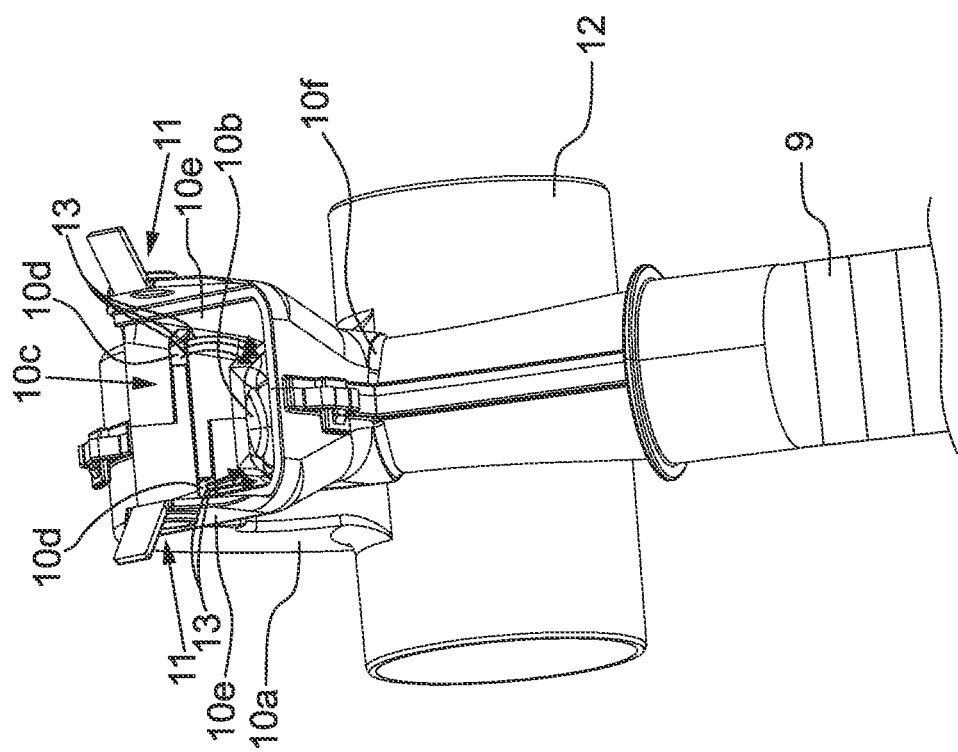
Figure 4:
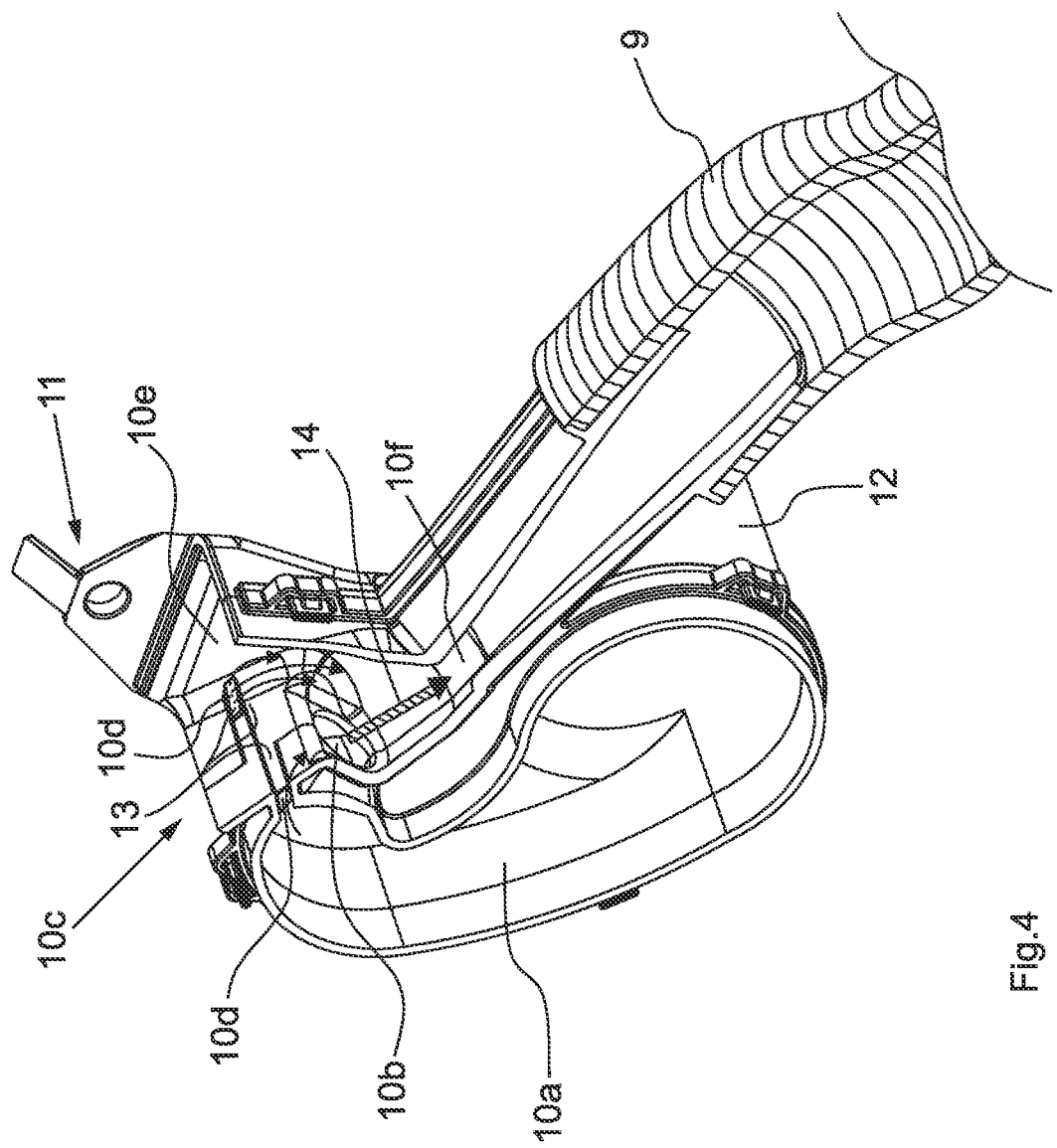

Further details of the invention can be gathered from the description of the examples and the drawings. In these drawings FIG. 1 shows a distribution machine attached behind a farming tractor with an elongate storage container in a perspective view, FIG. 2 shows the storage container in the state dismantled from the distribution machine in a sectional view from the side, FIG. 3 shows a single perspective view of a material introduction lock, and FIG. 4 shows the material introduction lock according to FIG. 3 in a sectional view.

A distributing machine configured as a single grain sower 2 attached behind an agricultural tractor 1 can be seen in FIG. 1. Single grain sower 2 comprises a storage container which is elongate transverse to direction of travel F and which serves as a fertilizer container 3, and furthermore sowing assemblies 4 that are arranged on a beam likewise transverse to direction of travel F. Sowing assemblies 4 each comprise a seed container 5 and a separating device concealed by seed container 5 for the separated delivery of seeds, as well as tillage tools 6. Due to the equidistant arrangement of sowing assemblies 4 on the beam transverse to direction of travel F, an agricultural field is worked in several so-called rows 7, where the number of rows 7 in this case corresponds to the number of sowing assemblies 4.

Figure 2:
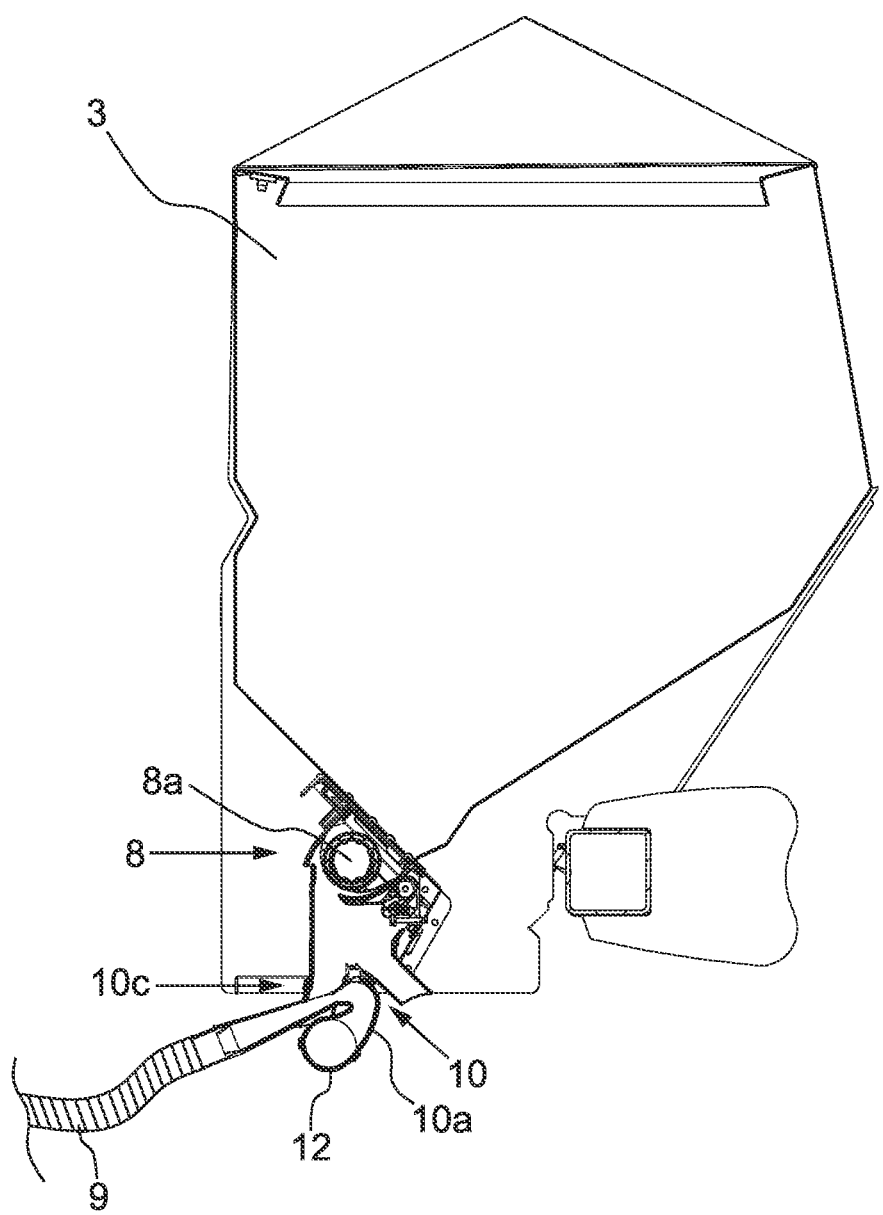

As shown in FIG. 2, fertilizer container 3 is associated in direction of travel F at its lower rear end with one metering device 8 per row 7 or sowing assembly 4, respectively. Metering device 8 is equipped with a metering wheel 8a that can be driven to rotate and is configured to dispense granular material, in the present case fertilizer from fertilizer container 3, in controlled quantities into a conveying line 9 connected to respective metering device 8. Respective conveying line 9 connects metering device 8 with which it is associated via a material introduction lock 10 to tillage tools 6 of one of sowing assemblies 4 so that a so-called fertilizer belt is deposited in the soil in each row 7. In an embodiment not shown, sowing assemblies 4 can be associated with upstream fertilizer coulters for separately depositing the granular material.

Material introduction lock 10 is used for pneumatically conveying the fertilizer dispensed by respective metering device 8, on which it is arranged by way of devices configured as snap closures 11 for the releasable attachment, in respective conveying line 9 adjoining a material introduction lock 10. For this purpose, material introduction lock 10 of each row 7 can be supplied a pneumatic conveying flow generated by a blower (not shown) via an air inlet 10a. Air inlet 10a adjoins a connection member 12 which is used to couple respective material introduction lock 10 to a superordinate air line that connects all material introduction locks 10 to the blower. Furthermore, material introduction lock 10 comprises a material conveying element 10b and a material infeed element 10c, as shown in detail in FIGS. 3 and 4. The pneumatic conveying flow generated by the blower can be supplied to material conveying element 10b via air inlet 10a. By arranging material infeed element 10c between material conveying element 10b and conveying line 9, fertilizer supplied by metering device 8 via material infeed element 10c is conveyed in conveying line 9 by the pneumatic conveying flow that is used at least in part.

In order to counteract clogging of material introduction lock 10 and the load by fouling in general, material infeed element 10c comprises a rinsing nozzle element which is connected to air inlet 10a and is formed by two segment nozzles 10d. A part of the pneumatic conveying flow is branched off from air inlet 10a via segment nozzles 10d and flows in in the region of oppositely disposed and upright side walls 10e that co-form material infeed element 10c. Segment nozzles 10d generate a film of air, indicated by solid arrows 13, which nestles particularly well against side walls 10e due to the arrangement adjoining side walls 10e. Overall, material infeed element 10c is sheathed from the inside by the film of air, i.e. a load-carrying layer of air flows over the inner walls of material infeed element 10c so that the rinsing nozzle element formed by segment nozzles 10d ensures by way of the film of air (cf. arrows 13) that there is less contact between the fertilizer supplied and material introduction member 10c. The film of air created in this manner forms a pneumatic separating layer on which the fertilizer seeds drizzling in float towards conveying line 9.

In order to simultaneously ensure the reliable conveying function of the material conveying element 10b by ensuring that a sufficient proportion of the pneumatic conveying flow flows through material conveying element 10b, the total opening cross section of segment nozzles 10d forming the rinsing nozzle element through which the flow passes is smaller by about a one half than the cross-section of material conveying element 10b through which the flow passes. Assuming the same mean flow velocities, the pneumatic conveying flow is divided at least approximately in the ratio of the cross-sectional areas, so that the combined opening cross-section of the segment nozzles 10d through which the flow passes being smaller by one half than the opening cross section of the material conveying element 10b through which the flow passes results in approximately twice as much air being available for pneumatically conveying the fertilizer in conveying line 9 than for forming the film of air.

A particularly advantageous form of the film of air is achieved in that segment nozzles 10d have a rectangular shape that is elongate transverse to the direction of flow. As a result, the film of air is formed as a flat jet so that a particularly large-area flow through material infeed element 10c is obtained. As shown by FIG. 3, segment nozzles 10d are arranged at least approximately adjacent to one another at a slightly different distance from material conveying element 10b in material infeed element 10c. The desired effect here is also that the film of air is formed as large-area as possible.

As is evident from the sectional view of material introduction lock 10 in FIG. 4, material conveying element 10b is configured as a drive nozzle 10b and converts the pneumatic conveying flow supplied via connection member 12 and air inlet 10a into a conveying jet 14. Conveying jet 14 is directed in the direction toward conveying line 9 adjoining material introduction lock 10 and then creates a suction effect in material infeed element 10c in the direction toward conveying jet 14 on the basis of the Venturi effect. In this respect, material introduction lock 10 can also be referred to as an injector device 10. Since material infeed element 10c does not seal metering device 8 in an airtight manner, moist ambient air is also drawn in in the direction toward conveying line 9 in addition to the fertilizer dispensed. The effect of the film of air created by way of the rinsing nozzle element formed by segment nozzles 10d, again indicated by arrows 13, is all the more important which reduces contact between the frequently hygroscopic fertilizers and material infeed element 10c.

Material introduction lock 10 further comprises a diffuser neck 10f between conveying line 9 and material infeed element 10c. Diffuser neck 10f forms a cross-sectional taper in the direction of flow towards conveying line 9, whereby the flow velocity increases and the fertilizer is thereby additionally accelerated in conveying line 9 and the suction effect in material infeed element 10c is increased.

LIST OF REFERENCE CHARACTERS 1 farming tractor
2 single grain sower
F direction of travel
3 fertilizer container
4 sowing assembly
5 seed container
6 tillage tool
7 row
8 metering device
8a metering wheel
9 conveying line
10 material introduction lock
10a air inlet
10b material conveying element
10c material infeed element
10d segment nozzle
10e side wall
10f diffuser neck
11 snap closure
12 connection member
13 arrow
14 conveying jet

The invention claimed is:

1. A material introduction lock for a distribution machine, for pneumatically conveying granular material in a conveying line adjoining said material introduction lock, comprising:
an air inlet, a material conveying element, and a material infeed element,
wherein a pneumatic conveying flow is supplied to said material conveying element via said air inlet,
wherein said material infeed element is arranged between said material conveying element and said conveying line so that the granular material in said conveying line supplied via said material infeed element is conveyed in said conveying line by the pneumatic conveying flow supplied by said material conveying element,
wherein said material infeed element comprises at least one rinsing nozzle element which is connected to said air inlet and which creates a film of air that sheathes said material infeed element from an inside thereof, and
wherein said at least one rinsing nozzle element is configured to reduce contact between said granular material and said material infeed element due to the film of air.

2. The material introduction lock according to claim 1, wherein an opening cross section of said at least one rinsing nozzle element is smaller than a cross section of said material conveying element.

3. The material introduction lock according to claim 2, wherein the opening cross section of said at least one rinsing nozzle element has a shape that is elongate transverse to a direction of flow passage.

4. The material introduction lock according to claim 1, wherein said material infeed element comprises at least two oppositely disposed approximately upright side walls, and said at least one rinsing nozzle element extends between said at least two side walls, so that the film of air nestles against said side walls.

5. The material introduction lock according to claim 1, wherein said at least one rinsing nozzle element is formed by at least two segment nozzles.

6. The material introduction lock according to claim 5, wherein said at least two segment nozzles are arranged at least approximately adjacent to one another.

7. The material introduction lock according to claim 5, wherein said at least two segment nozzles are arranged at different distances from said material conveying element.

8. The material introduction lock according to claim 1, wherein said material introduction lock is configured as an injector device, and said material conveying element is configured as a drive nozzle which converts the pneumatic conveying flow into a conveying jet that is directed at least approximately into said conveying line and thereby creates a suction effect in said material introduction element.

9. The material introduction lock according to claim 1, wherein said material introduction lock comprises a diffuser neck, and said diffuser neck is arranged between said material introduction element and said conveying line so that the granular material in said conveying line is additionally accelerated.

10. The material introduction lock according to claim 1, wherein the distribution machine is a sower, single grain sower, or a fertilizer distribution machine.

11. The material introduction lock according to claim 2, wherein the opening cross section of said at least one rinsing nozzle element is smaller than the cross section of said material conveying element by approximately half.

12. The material introduction lock according to claim 2, wherein the opening cross section of said rinsing nozzle element is rectangular so that the film of air is formed as a flat jet.

13. A distribution machine, comprising:

a storage container for granular material and tillage tools arranged side by side transverse to a direction of travel for depositing granular material in several rows, wherein said storage container is associated with at least one metering device for each of the several rows for dispensing the granular material in controlled quantities into a conveying line that connects said at least one metering device for delivering bulk material to said tillage tools, and wherein a material introduction lock for pneumatically conveying the granular material in said conveying line is arranged between said metering device and said conveying line of each of the several rows, such that a pneumatic conveying flow created by a blower is at least in part directed to said material introduction lock of each of the several rows.

\* \* \* \* \*